UNITED STATES PATENT OFFICE.

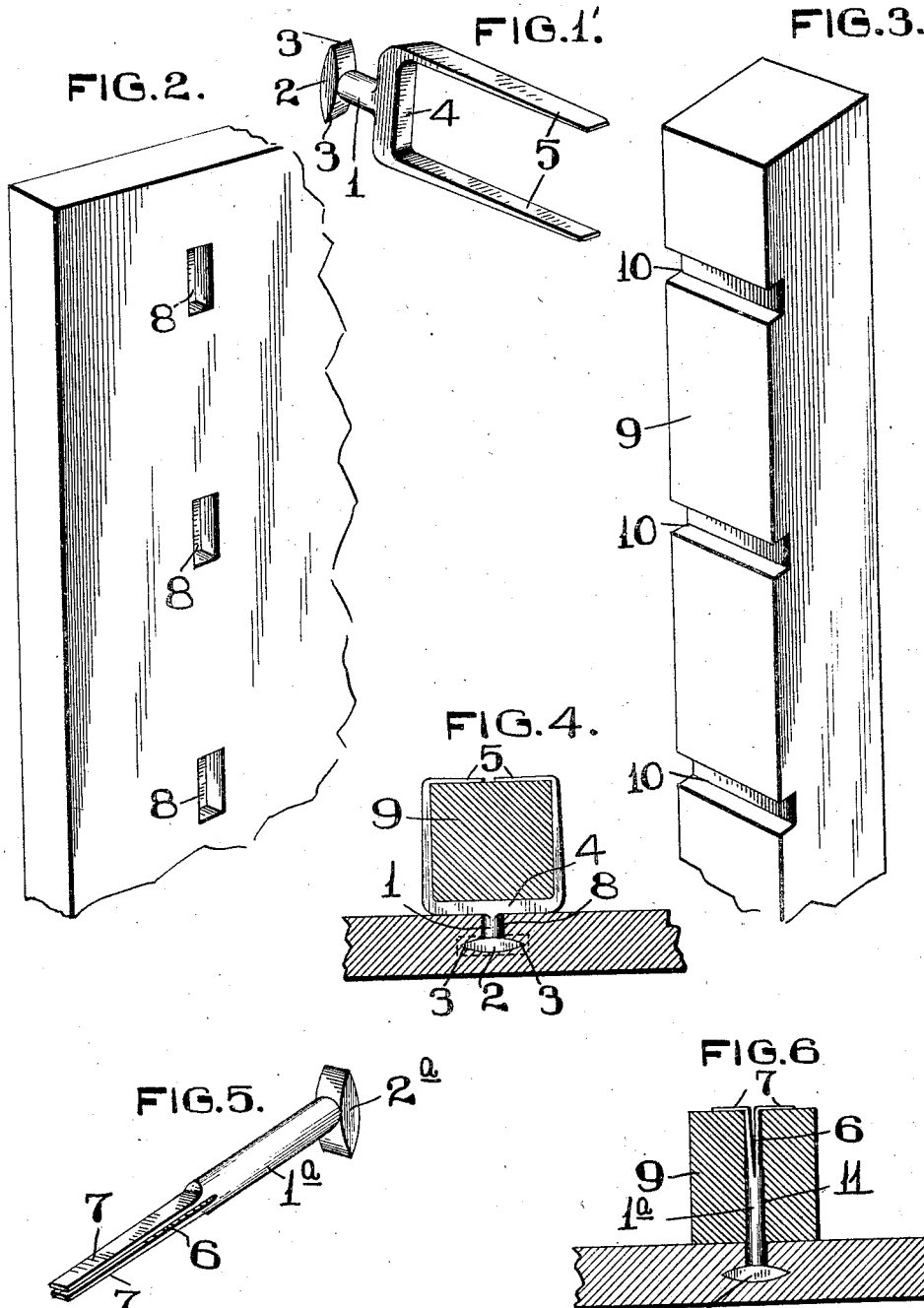

WILLIAM H. ROCHE, OF ST. LOUIS, MISSOURI.

DEVICE FOR CONNECTING STRUCTURAL PARTS.

No. 831,377.     Specification of Letters Patent.     Patented Sept. 18, 1906.

Application filed October 18, 1905. Serial No. 283,341.

*To all whom it may concern:*

Be it known that I, WILLIAM H. ROCHE, a citizen of the United States, and a resident of St. Louis, Missouri, have invented certain new and useful Improvements in Devices for Connecting Structural Parts, of which the following is a specification, containing a full, clear, and exact description, reference being had to the accompanying drawings, forming a part hereof.

My invention relates to a device for connecting structural parts; and the object of my invention is to produce simple means for rigidly securing and fastening parts of structures, such as machinery, boxes, trunks, vehicles, and all other structures—where it is necessary to provide a simple and rigid fastening.

To the above purposes my invention consists in certain novel features of construction and arrangement of parts, which will be hereinafter more clearly set forth, pointed out in my claims, and illustrated in the accompanying drawings, in which—

Figure 1 is a perspective view of the preferred form of my improved fastening device. Fig. 2 is a perspective view of a panel in which the head of my improved fastening device is secured. Fig. 3 is a perspective view of a post or similar member, around which the prongs of the fastening device are secured. Fig. 4 is a horizontal section showing two parts of a structure joined by my improved device and method of fastening. Fig. 5 is a perspective view of the modified form of the fastening device. Fig. 6 is a horizontal section analogous to Fig. 4 and illustrating the method of connecting the parts by the modified construction.

In the construction of the preferred form of my improved device a short shank 1, preferably circular in cross-section, is provided on one end with a transversely-arranged integral head 2, the opposite ends 3 of which are knife-edged. Formed integral with the opposite end of the shank 1 is a transversely-arranged plate 4, that lies parallel with the head 2, and formed integral with the ends of this plate 4 are elongated flat fingers 5.

The entire device is preferably formed of malleable steel or iron, and, if desired, the fingers 5 may be gradually narrowed in thickness toward their outer ends in order that they may be readily bent.

In the modified construction of the device the shank 1ª is elongated and provided on one end with the head 2ª, and the opposite end of said shank is provided with a longitudinally-extending slot 6, and the portions 7 on each side of said slot are flattened so as to be easily bent.

In the use of my improved fastening device a rectangular recess, such as 8, is formed in one of the parts of the structure, preferably the wall or panel to which it is desired to secure the opposite piece of the structure, such as a post or rail, which recess is of such size as that it will readily accommodate the head 2. The post or rail 9 that is to be fastened to the plate or panel is provided in one face with a transverse groove 10, which is of such a size as to receive the plate 4 of the fastening device. The head 2 of the fastening device is inserted in the recess 8, and then said device is turned at right angles to the length of the recess, and this action very firmly embeds the ends of the head 2 in the wall or panel to the sides of the base of said recess. The post or rail 9 is now positioned between the fingers 5, so that the plate 4 occupies the groove 10, after which the projecting ends of the fingers 5 are bent downwardly across the outer face of the post or rail, and thus the two parts of the structure are very rigidly and firmly joined.

In the use of the modified form of my improved construction a hole 11 is formed through the post or rail 9, through which hole passes the shank 1ª and the inner portions of the fingers 7. The projecting portions of these fingers 7 are bent downwardly onto the face of the post or rail 9 to rigidly secure the parts together.

My improved fastening device is more particularly adapted for use in connecting parts of a wooden structure, although where the head of the device is to be seated in a metallic plate the recess 8 must be provided with a transverse recess, such as shown by dotted lines in Fig. 4, at its inner end to receive the head 2 when the same is turned at right angles to the length of the recess 8.

Thus it will be seen how I have produced a simple and inexpensive means of rigidly securing two parts of a structure, such as a machine, box, or vehicle. No special tools are needed to carry out my improved method of fastening, and as the heads of the fastening device are hidden in the recesses the parts that are fastened together present a very neat and finished appearance.

I claim—

1. A device for connecting structural parts, comprising an elongated shank, a pair of ductile fingers integral with one end of the shank, a head integral with the opposite end of the shank, which head is equal in width to the diameter of the shank but considerably greater in length than is the width of said shank, and the outer ends of said head being V-shaped in longitudinal section and being knife-edged; substantially as specified.

2. A device for connecting structural parts, comprising a straight shank, one end of which is slotted, and the portion of said shank at the slotted end being flattened, an elongated head integral with the opposite end of the shank, which head is equal in width to the diameter of the shank but greater in length, and the outer ends of said head being V-shaped in longitudinal section, and said V-shaped ends being knife-edged; substantially as specified.

In testimony whereof I have signed my name to this specification in prscence of two subscribing witnesses.

WILLIAM H. ROCHE.

Witnesses:
M. P. SMITH,
J. C. HIGDON.